United States Patent Office 3,823,025
Patented July 9, 1974

3,823,025
ARTICLE COMPRISING AN ADHESIVE COATING AND CONTROLLED RELEASE COATING
Thomas S. Mestetsky, Easton, Pa., assignor to GAF Corporation, New York, N.Y.
No Drawing. Filed July 27, 1971, Ser. No. 166,569
Int. Cl. C09j 7/04
U.S. Cl. 117—68.5    9 Claims

ABSTRACT OF THE DISCLOSURE

A base sheet material one surface of which carries an outer adhesive layer, the other surface of said sheet material carrying an outer layer of an aqueous controlled release coating composition comprising a cured mixture of an aqueous organopolysiloxane emulsion and a water soluble homopolymer or copolymer of an aliphatic unsaturated dibasic acid or derivative thereof. As the amount of said water soluble polymer increases, the required release force decreases below that of pure organopolysiloxane to a minimum, and then gradually increases to a level above that of the organopolysiloxane. Typical compositions comprise an aqueous emulsion of a polymethylsiloxane and a polyvinyl methyl ether/maleic anhydride copolymer in a 10:1 to 1:10 ratio on a weight basis.

---

The present invention relates to novel polysiloxane controlled release compositions and to the use of such compositions.

Controlled release coatings, or "abhesives," are coatings which are applied to a substrate to prevent or decrease the adhesion of another substance to it. Controlled release is the ability to control release between a coating and an adhesive substrate. Release is a measure of the degree of adhesion which a sticky or tacky substance displays towards an abhesive coating. Controlled release coatings are widely used as mold release agents, as pressure sensitive label backings and as coatings for containers to facilitate removal of the contents thereof.

Silicone resins have been employed widely as release coatings notwithstanding their high cost because they are capable of providing excellent release properties. For some uses, however, their release capabilities are too great. For example, in pressure sensitive tape use, the tape must be easily separated from the backing, but the backing must be sufficiently adherent to prevent it from accidentally falling off or sliding away, an occurrence which is not too infrequent in practice. Agents are known which effectively reduce the release properties of the silicones. However, one difficulty with most such agents is that they are too effective; and when added to silicone release compositions, in even small amounts, they produce quite a large reduction in release properties. For example, addition of about 20% by weight of a known commercially available controlled release agent to a commercially available silicone release coating, leads to about a 100% increase in release force. The direct disadvantage of this disproportionate effect is that small changes in release properties cannot be readily obtained. Indirectly, this is commercially disadvantageous because it means that high cost silicone release compositions cannot be diluted with significant percentages of less costly materials without trading off too much of the inherent release properties of the silicones.

Some end uses require greater abhesion than is available with known silicone release agents. Thus, adhesive coatings are applied to self-stick floor tiles or decorative wall coverings by contacting the underface of the tile or covering with a release paper coated with a layer of pressure sensitive adhesive. Adhesive coated release paper is normally supplied in the form of large rolls. In order to have the adhesive coating uniformly adhere to the face of the release paper as the roll is unwound, the underside of the release paper is coated with a release coating which is more abhesive than the coating on the face to obtain the desired differential release force. Thus, the adhesive coating adheres to the face of the release paper with greater force than to the underside of the release paper, but with less force than to the floor tile or wall covering. Differential release paper is presently prepared by coating one side of the paper with highly abhesive silicone containing no control release additive; and the other side of the paper with less abhesive silicone containing a control release additive. Thus, in order to obtain differential release, the release properties of the silicone release coating on one side of the paper must be decreased. This presents a real problem where highly abhesive backings are required for example where the backing is applied to an inflexible material such as a floor tile or to a relatively large surface, in which cases it is sometimes desirable and necessary to lift the surface vertically from its release backing rather than separating the latter from the former by peeling. In such cases, the decrease in abhesiveness causes much greater difficulty in removing the release coated backing, and accordingly, it would be desirable to be able to prepare a differential release paper in which the least abhesive side is no less abhesive than silicone release coatings without control release agents.

In view of this state of the art it is accordingly an object of the present invention to provide silicone release compositions with varying release capabilities to suit varying release requirements.

It is another object of this invention to provide silicone release compositions which contain relatively large amounts of relatively low cost release control additives while retaining relatively high release values.

It is still another object of this invention to provide release compositions containing silicone release polymers and relatively large amounts of different relatively low cost polymers, which compositions are more abhesive than the silicone release component by itself.

It is yet another object of this invention to provide a method of imparting abhesiveness to a surface, and articles having abhesive surfaces.

Other objects of this invention will be apparent from the following description thereof.

It has now been discovered, in accordance with the present invention, that an effective release coating composition is provided by the combination of an aqueous polysiloxane emulsion and a water soluble polymer of an unsaturated aliphatic dibasic acid ar metal, amino or ammonium salt, anhydride, acid, ester, amide, imide derivatives thereof. The proportion of the water soluble polymer in the release composition has a marked effect upon the abhesiveness of the composition. As the amount of said polymer increases up to a certain point, the abhesiveness of the combination also increases. Beyond this point, an increase in the concentration of said water soluble polymer is accompanied by a decrease in abhesiveness. Thus, the water soluble polymer can be used to either increase or decrease the abhesiveness of a silicone release composition by adjustment of the proportion thereof in the release coating composition. Advantageously release compositions having the same release force as the silicone base by itself can be prepared by combining the silicone with a large proportion of the much less costly water soluble polymer. Thus, the present invention provides both flexibility and economy in the preparation of release coating compositions.

The water soluble polymers of aliphatic dibasic acids or derivatives thereof used in the compositions of the present invention to change the release force of emulsified silicone polymers must be at least partially soluble in water. Some poymers are completely soluble in water and others are partially soluble in water. Since the release coating compositions of the present invention do not necessarily have a high solids content, even slightly soluble polymers can be employed in certain situations. For example, release coating compositions are often applied from emulsions having a polymer content as low as about 1%. Of this amount, the polymer derived from the aliphatic unsaturated dibasic acid (or derivative thereof) may comprise between about 1 and 99 weight percent, depending upon properties which it is desired to impart to the release composition. Thus, any such polymer having a solubility of at least 0.01 part per 100 parts of water is useful to accomplish the objects of the present invention.

The water soluble polymers of aliphatic unsaturated dibasic acids useful in the present invention must contain at least 15 mole percent of recurring units of the formula (I):

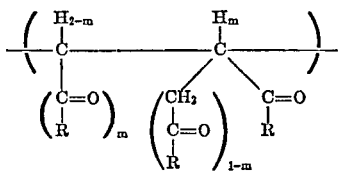

wherein each R is individually OR' or N(R'')$_2$, R' being H, C$_1$-C$_3$ alkyl (e.g. methyl, ethyl, propyl, etc.) metal, amino or ammonium cation or the two R's taken together form an oxa or imide linkage; R'' is H or C$_1$-C$_3$ alkyl; and m is 0 or 1.

Homopolymers of maleic anhydride and derivatives included in Formula I can be prepared by homopolymerization of maleic anhydride followed by the optional treatment of the resultant maleic homopolymers with hydrolysis, esterification or amination reagents to convert the anhydride groups. For example, maleic anhydride can be homopolymerized to poly(maleic anhydride) and then treated with any one of several reagents which convert the anhydride ring to pendant carboxy ester or amido groups. Thus, poly(maleic anhydride) can be treated with ammonia under conditions leading to the production of either poly(maleamic acid ammonium salt) or poly(maleamide) or poly(maleic imide). Either derivative can be converted by known hydrolysis, esterification and/or alkylation procedures to polymers devoid of pendant hydrocarbon moieties of 4 or more carbon atoms. Alternatively, the poly(maleic anhydride) can be treated with water to produce poly(maleic acid) or with inorganic or organic bases to produce metal, ammonium or amine salts of poly(maleic acid). These salts can be further converted if desired by esterification and/or alkylation reactions to the desired polymer.

Such polymers should preferably contain at least 30 mole percent of said recurring units of formula I and can alternatively be copolymers of maleic, fumaric and/or itaconic acids or amide, anhydride, imide, ester, and/or salt derivatives thereof, with each other and/or with other copolymerizable vinyl monomers containing a CH$_2$=C< group. Such copolymers can be prepared in accordance with the methods disclosed in U.S. Pat. 2,047,398. In general, the copolymers are prepared by vinyl polymerization of an aliphatic unsaturated dibasic acid of 4 to 5 carbons or the aforementioned derivatives of such acids with at least one such vinyl monomer in the presence of a free radical catalyst. Among the useful comonomers are vinyl esters such as vinyl acetate and vinyl propionate; vinyl ethers such as methyl vinyl ether, ethyl vinyl ether and propyl vinyl ether; acrylic and methacrylic acids and esters such as methyl acrylate, ethyl acrylate, propyl acrylate, methyl methacrylate, ethyl methacrylate and propyl methacrylate; acrylamide and methacrylamide and their C$_1$-C$_3$ alkyl substituted analogs; vinyl chloride, vinylidene chloride, ethylene, and propylene and the like. These polymers and copolymers of unsaturated aliphatic dibasic acids or derivatives thereof preferably have a molecular weight of about 10,000 to 2 million.

Among the most useful water soluble polymers or precursors thereof are those of maleic anhydride, maleic acid, maleic amide, maleic imide, partial esters of maleic acid with alcohols of less than about 4 carbon atoms and metal, ammonium or amino salts of the acids, partial esters or partial amides, and mixtures thereof. Maleic polymers useful in the present invention should contain at least about 15 mole percent, and preferably at least 30 mole percent, of the recurring unit (II):

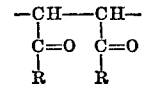

wherein each R is individually OR' or N(R'')$_2$, R' being H, C$_1$-C$_3$ alkyl (e.g., methyl, ethyl, propyl, etc.), or a metal or ammonium cation, or the two R's taken together are an oxa or imide linkage; R'' is H or C$_1$-C$_3$ alkyl with the remaining units being (III):

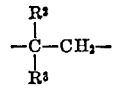

wherein R$^2$ is hydrogen or methyl and R$^3$ is COOR', OR', CN, or halo (e.g., chloro or fluoro).

While polymers having a low degree of water solubility can be used in accordance with the present invention, it is preferred to use polymers which are highly soluble in water or react with water to yield water soluble polymers such as polymaleic anhydride, polymaleic acid, methyl vinyl ether/maleic anhydride copolymer, copolymeric ethylene/maleic anhydride and the like. In particular, a useful maleic polymer is the copolymer of methyl vinyl ether and maleic anhydride in equimolar proportions.

The aqueous silicone emulsion component of the compositions of this invention are known materials prepared and curable by methods well known in the art. Any known organosiloxane release agent which is emulsifiable in water and preferably has a molecular weight of about 800–2000 may be employed. For example, the use of organosiloxanes such as methylhydrogenpolysiloxane, or trimethyl end-blocked dimethylpolysiloxane fluid or combinations thereof as well as mixtures of hydroxylated dimethylpolysiloxanes and methylhydrogenpolysiloxanes is contemplated in accordance with the present invention. Various organo siloxane release agents and methods for preparing and curing same are disclosed in U.S. Pat. 3,050,411, U.S. Pat. 3,061,567 and British Pat. 882,378.

As is well known, the silicone release agents can be cured without a catalyst, but the use of a catalyst materially increases the rate of curing and is therefore preferred. The type of catalyst is limited only by its stability in an aqueous composition and among the well known catalysts are the metal salts of carboxylic acids, such as lead octoate, dibutyl tin diacetate, dibutyl tin dilaurate, zinc octoate, ferric octoate, ferric naphthenate, cobalt naphthenate, tin octoate, tin naphthenate, tin oleate, butyl tin trioctoate and the like, generally employed in weight ratios of about 0.1 to 100 parts per 100 parts of polysiloxane. A useful commercially available system is that of Dow Corning Chemical Co. comprising Syl-off 22 polysiloxane solution (aqueous, 40% active) and Catalyst 22A organometallic salt solution (aqueous, 20% active).

The ratio of silicon to water soluble polymer will determine the release force required to remove an adhesive from the coating produced by application of the composition of the present invention to a surface. Generally as the amount of water soluble polymer is increased up to about 50% (the exact amount being determined by the specific polymer which is used), abhesiveness is also increased. As the amount of water soluble polymer is increased beyond 60% up to about 99% of the total polymer content of the coating composition, abhesion decreases. Since abhesion goes through a minimum as the ratio of water soluble polymer is increased, it is possible to obtain the desired level of abhesion with either the high silicone content or high-water soluble polymer content composition. Thus, for example, both a 90:10 and a 50:50 mixture of silicone and a methyl vinyl ether/maleic anhydride copolymer exhibit virtually identical levelus of abhesion. Similarly, the same polymers in a combination of 99:1 and 27:75 also have approximately the same degree of abhesion. This remarkable phenomenon allows unique flexiblity in the preparation of release coating compositions. Accordingly, it is convenient and practical to use controlled release compositions in which the resin content comprises between about 1 and 99% silicone release polymer and 99 and 1% water soluble polymer, the specific ratio of the two polymers being determined by the end use of the release coating composition. The total amount of polymer in the controlled release coating composition, on a weight basis, can vary in the range of 1.0 to 50% and even more. The only requirement is that the solution be of sufficient concentration to form a substantially continuous coating on the surface to which it is applied after the water has been evaporated. Coating weights of preferably 0.2 to 0.7 lbs./3000 ft.$^2$ are useful for most purposes.

The coating compositions of the present invention in addition to the silicone and water soluble polymers and the optional catalyst for curing the silicone may further contain, if desired, conventional auxiliary agents such as thickening agents and additives. Thickening agents may be added to these compositions in order to adjust their viscosities to the requirements of the equipment used to apply the coating composition and to regulate coating pick-up and holdout. Likewise, the use of such conventional additives as plasticizers and the like is also permissible.

The release coating compositions of the present invention may be applied to a surface by conventional air knife, trailing blade, roll, spraying, printing or casting methods. The coated substrate is then subjected to curing treatment which generally involves subjecting the surface to heat for a short period of time. Curing may be effected by heating the coated surface for about 0.1 to 3 minutes at about 200° to 400° F. Curing can be accelerated or decelerated by increasing or decreasing catalyst concentration, respectively. Of course, as is well known, curing can also be effected at room temperature although this approach requires a relatively great amount of time.

The controlled release coating compositions of the present invention can be applied to a wide variety of surfaces to take advantage of their release properties. They can be used as mold release properties. They can be used as mold release agents on bakery pans and candy trays. Likewise, they can be used on paper, plastics and metal foils to provide release coatings when their materials are made into containers for such products as asphalt, wax, resin and the like. They can also be used to coat multiwall bags and cartons which will contain rubber and to coat cartons which will contain candy, baked goods and other sticky products. They are also useful to coat backing sheets for pressure sensitive tapes, labels, tags, decals, self-bonding wallpaper, decorative plastics and asphalt impregnated pipe wrapping. Thus, in general they can be used to coat any type of material such as the cellulosics (e.g., bleach sulfate, clay coated kraft, glassine, parchment, tissue and the like) and plastics such as nylon, polyacrylonitrile, polyesters, styrene, vinyl plastics, polyurethanes and other organic resin materials. Moreover, they are also applicable to inorganic materials such as ceramics or metals such as aluminum, magnesium, copper, steel or zinc.

The following examples are presented to further illustrate the present invention. All parts and proportions referred to herein and in the appended claims are by weight unless otherwise indicated.

EXAMPLE 1

A polymethylsiloxane aqueous emulsion (40% active) is mixed with a 20% water solution of a copolymer of equimolar amounts of vinyl methyl ether and maleic anhydride (Gantrez AN 119, GAF Corporation) in various ratios. An aqueous solution of dibutyltin diacetate catalyst (20% active) is added in an amount equal to 20% of the weight of the polysiloxane emulsion. The mixtures are coated on a 25 lb./3000 square feet glassine sheet to a wet thickness of 0.5 mil and tested for release properties by the following procedure:

(1) The adhesive side of a one inch wide Johnson and Johnson red cross tape is applied to the release coated surface using a 4.5 lb. rubber covered roller.

(2) Three such tape/release coating laminates are placed in a Carver laboratory press (using 6 inch platens) and subjected to a pressure of 2100 lbs. for 15 minutes.

(3) The laminate is then pulled apart in a T-peel using a pendulum type tensile tester (made by Suter Manufacturing Company of Brooklyn, N.Y.) at a separation speed of 12 inches per minute.

The force required to delaminate the tape is measured and is reported in the following Table for each of the silicon-maleic polymer ratios.

TABLE I

| Polymer composition (weight percent) | | Release force grams/inch width |
|---|---|---|
| Silicone | Maleic | |
| 100 | 0 | 50 |
| 90 | 10 | 20 |
| 75 | 25 | 17 |
| 50 | 50 | 19 |
| 25 | 75 | 47 |
| 10 | 90 | 147 |

It can be seen from the data in Table I that differential release can be obtained by using a silicone polymer release coating on one side of the release paper and combinations of silicone polymer and maleic polymer having release forces either below or above that of the silicone, on the other side of the paper.

EXAMPLE 2

A mixture of 75% of the silicone emulsion employed in Example 1 and 25% of a copolymer of ethylene and maleic anhydride having a viscosity of 5.0 cps. in a 2% water solution; and 20% by weight of the catalyst solution employed in Example 1 (based upon the weight of the silicone) is prepared and mixed with sufficient water to give a solids content of 5%. The mixture is coated and tested in accordance with the procedures set forth in Example 1. The release force is found to be 42 grams/inch width.

EXAMPLE 3

The procedure of Example 2 is followed identically except that polymaleic anhydride is substituted for the copolymer of ethylene and maleic anhydride used therein. The mixture is coated and tested by the procedure set forth in Example 1 and found to have a release force of 18 grams per inch width.

This invention has been disclosed with respect to certain preferred embodiments, and it will be understood that modifications and variations thereof will become obvious to persons skilled in the art and are intended to be included within the spirit and purview of this application and the scope of the appended claims.

What is claimed is:

1. A base sheet material one surface of which carries an outer adhesive layer, the other surface of said sheet material carrying an outer layer of an aqueous controlled release composition comprising 1.0 to 50% by weight of a cured mixture of:
(a) an aqueous emulsion of a silicone release polymer; and
(b) a water soluble polymer having at least 15 mole percent of a recurring unit having the following formula:

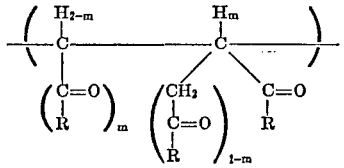

wherein each R is individually OR' or N(R")$_2$, R' being H, C$_1$–C$_3$ alkyl or a metal, amino or ammonium cation or the two R's taken together form an oxa or imide linkage; R" is H or C$_1$–C$_3$ alkyl; and $m$ is 0 or 1; the silicon and maleic polymers being present in a weight ratio in the range of 99:1 to 1:99.

2. The base sheet material of Claim 1 wherein the water soluble polymer is a polymer of maleic anhydride, maleic acid, maleic amide, maleic imide, a partial ester of maleic acid with an alcohol of less than four carbon atoms, or a metal, amino or ammonium salt of the free acid, partial ester or partial amide.

3. The base sheet material of Claim 1 wherein the maleic polymer is a homoploymer of maleic acid, maleic anhydride, maleic amide, or maleic imide.

4. The base sheet material of Claim 1 wherein the water soluble polymer is a copolymer of at least 15 mole percent of maleic anhydride, maleic acid, maleic amide, maleic imide or a partial ester of maleic acid with an alcohol of less than four carbon atoms; or a maleic copolymer with a comonomer of an alkyl vinyl ether containing 3 to 5 carbon atoms, a vinyl ester of a carboxylic acid of less than four carbon atoms, or an olefin of less than four carbon atoms.

5. The base sheet material of Claim 2 wherein the polymer is polymaleic anhydride.

6. The base sheet material of Claim 4 wherein the polymer is a copolymer of equimolar amounts of maleic anhydride and methyl vinyl ether.

7. The base sheet material of Claim 4 wherein the maleic polymer is a copolymer of equimolar amounts of maleic anhydride and C$_2$–C$_3$ alpha-olefin.

8. An article of manufacture comprising a surface coated with a controlled release composition comprising 1.0 to 50% by weight of a cured mixture of:
(a) an aqueous emulsion of a silicone release polymer;
(b) a water soluble polymer having at least 15 mole percent of a recurring unit having the following formula:

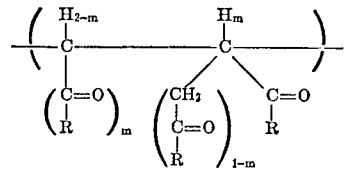

wherein each R is individually OR' or N(R")$_2$R' being H, C$_1$–C$_3$ alkyl or a metal, amino or ammonium cation or the two R's taken together form an oxa or imide linkage; R" is H or C$_1$–C$_3$ alkyl; and $m$ is 0 or 1; the silicone and maleic polymers being present in a weight ratio in the range of 99:1 to 1:99.

9. A base sheet material as defined in claim 1 wherein said adhesive is pressure sensitive.

References Cited
UNITED STATES PATENTS 2,869,722   1/1959   Marander et al. __ 260—29.6 NR
2,985,544   5/1961   De Monterey et al. 260—29.6 NR
3,294,709  12/1966   Nitzsche et al. ___ 260—29.6 NR
3,050,411   8/1962   Keil _____ 260—825 X WILLIAM D. MARTIN, Primary Examiner B. D. PIANALTO, Assistant Examiner U.S. Cl. X.R.

117—122 P, PF, 161 ZA; 260—29.6 NR, H